Inventors:
Geoffrey Walter Goslin
Charles Timothy Marwood
By
Karl W. Flocks
Attorney

WAVEFORMS WITH SQUARE WAVE FREQUENCY LOWER THAN PULSE FREQUENCY.

Inventors:
Geoffry Walter Goslin
Charles Timothy Marwood
By
[signature]
attorney Nov. 28, 1967 G. W. GOSLIN ET AL 3,355,644

FREQUENCY COMPARISON DEVICES INCLUDED IN STEP MOTOR CONTROL CIRCUITRY

Filed Nov. 12, 1963 5 Sheets-Sheet 3

Inventors:
Geoffrey Walter Goslin
Charles Timothy Marwood
By
[illegible]
attorney Inventors:
Geoffrey Walter Goslin
Charles Timothy Marwood
By
[illegible]
Attorney Inventors:
Geoffrey Walter Goslin
Charles Timothy Marwood
By
Attorney United States Patent Office 3,355,644
Patented Nov. 28, 1967

3,355,644

FREQUENCY COMPARISON DEVICES INCLUDED IN STEP MOTOR CONTROL CIRCUITRY

Geoffrey W. Goslin, Knebworth, and Charles T. Marwood, Welwyn Garden City, England, assignors to The De Havilland Aircraft Company Limited, Hatfield, England, a company of Great Britain Filed Nov. 12, 1963, Ser. No. 322,921
Claims priority, application Great Britain Nov. 12, 1962, 42,657/62
11 Claims. (Cl. 318—138)

This invention relates to frequency comparison devices.

Broadly stated, the present invention provides a frequency comparison device comprising means for deriving a plurality of relatively phase displaced pulse trains each having a common repetition frequency which is a function of a first frequency to be compared, a first set of two-input AND gates corresponding in number to the number of derived pulse trains and associated one with each derived pulse train, each gate having the associated derived pulse train applied to one input thereof, means for deriving a first square wave pulse train having a repetition frequency which is a function of a second frequency to be compared and for applying said first square wave pulse train to the other input of each gate and a separate two-state device associated with each gate and electrically connected to the output of the associated gate and arranged to assume one of its two states, for a period of time not less than the interval of time between successive pulses in any one of the plurality of derived pulse trains applied to the gates, upon receipt of an output pulse from the associated gate.

As will be understood, the first and second frequencies may be derived as respective functions of the magnitudes of one or more physical quantities in a process or control system and the rate of change of condition of the bistable device may be utilised to vary one or more system parameters in the sense to reduce the frequency difference.

The invention is of particular, but not exclusive, application to gas turbine engine control systems in which phased pulse trains are derived at a frequency which is a function of the actual gas generator speed and the datum value is the demanded value of the gas generator speed derived as a function of one or more other engine parameters, for example, the value demanded by the setting of a lever, such as the pilot's control lever, and the engine free turbine speed.

Some embodiment of the invention will now be described by way of example, reference being made to the accompanying drawings in which:

FIG. 1 is a block schematic circuit diagram of a control system embodying a frequency comparison device according to the invention, FIGS. 2A to 2H and 2J to 2N illustrate various wave forms occurring in the circuit of FIG. 1 under one condition of operation, FIGS. 3A to 3H and 3J to 3N illustrate wave forms similar to those of FIGS. 2A to 2H and 2J to 2N under another condition of operation, FIG. 4 is a circuit diagram illustrating a detail of FIG. 1.

Figure 1:
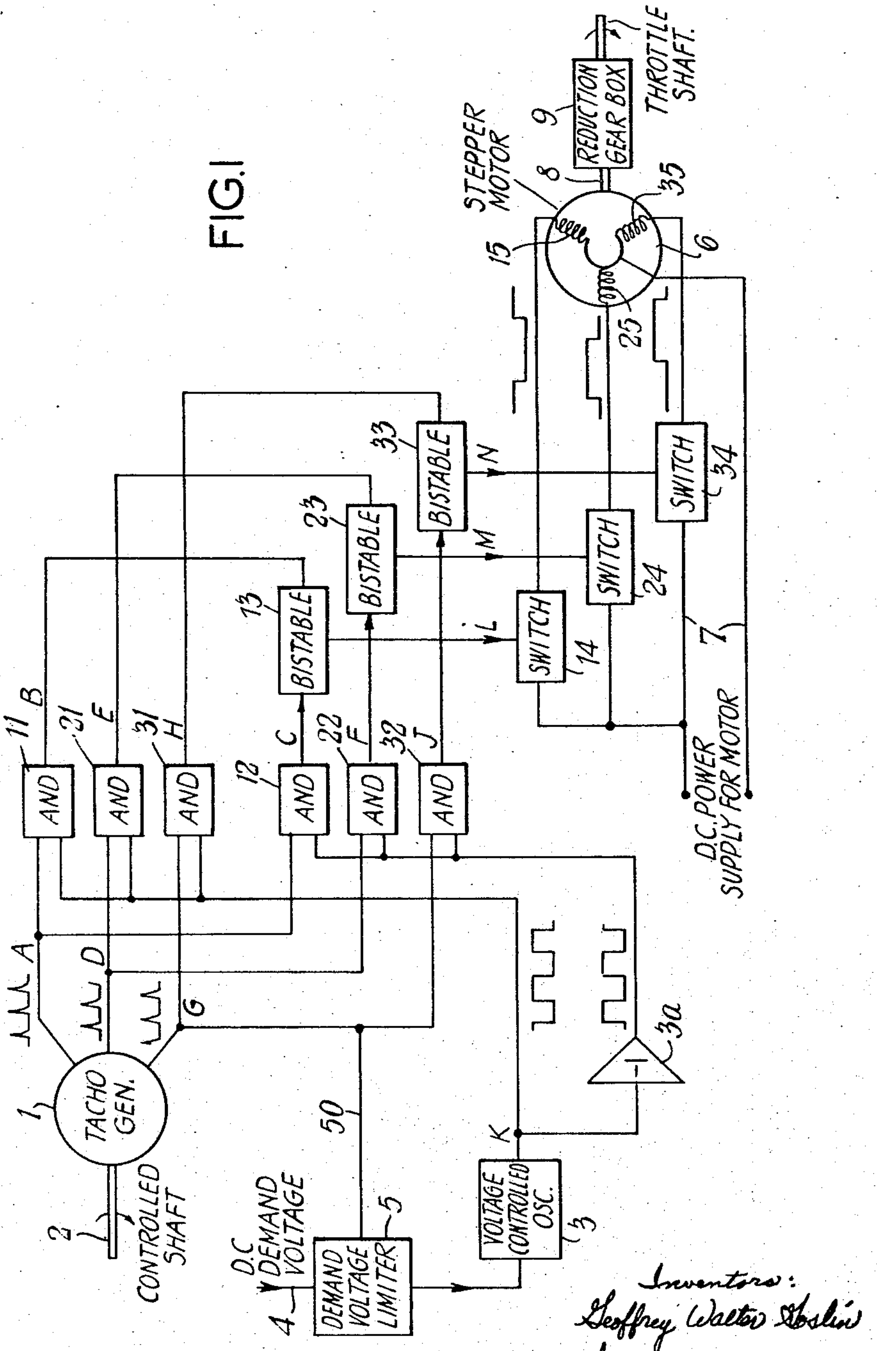

In the first example illustrated in FIGS. 1 to 4, a tachogenerator 1 is driven by a shaft 2, the speed of rotation of which is to be controlled. The tachogenerator has three pick-off coils (not shown) so positioned with respect to a shaped rotor (not shown) as to produce a pulse or "spike" of relatively short duration at each coil for each revolution of the rotor, the pulses being equally spaced in time. The utput from the tachogenerator 1 is thus three pulse trains phase displaced by 120° with respect to each other and separately appearing at output lines A, D and G respectively. These pulse trains are illustrated in FIGS. 2A, 2D, and 2G and FIGS. 3A, 3D and 3G. Each line A, D and G is connected to one input of each of a separate associated pair of AND gates so that two sets of three such gates are provided. The pair of gates associated with line A are denoted by the references 11 and 12, the pair associated with line D by the references 21 and 22, and the pair associated with line G by the references 31 and 32.

A voltage controlled oscillator 3 is provided to generate a train of square wave pulses (FIGS. 2K and 3K) at a repetition frequency which represents a datum value for the speed of rotation of the shaft 2 and which is represented by a D.C. demand voltage applied to line 4 and supplied to the oscillator 3 through a demand voltage limiting device 5 the purpose of which will hereinafter be explained. The pulses of the train of square wave pulses are of substantially longer duration than the spikes or pulses derived from the tachogenerator 1 and are applied to the other input of one of the gates in each pair, i.e. to gates 11, 21, and 31 and a similar train of square wave pulses in anti-phase to first such train is applied to the other input of the other of the gates in each pair, i.e. to gates 12, 22 and 32.

The anti-phase train of square wave pulses is conveniently derived from the first train of such pulses by means of a phase inverting amplifier 3*a* although it will be appreciated that both trains may be derived from a push-pull output in the oscillator 3.

Each gate is such as to produce an output only when a positive tachogenerator pulse and a positive square wave pulse appear simultaneously at its two inputs. The outputs from the gates 11, 12, 21, 22, 31 and 32 are respectively shown in FIGS. 2B, 2C, 2E, 2F, 2H and 2J for a tachogenerator pulse repetition frequency greater than that of the square wave pulse train and in FIGS. 3B, 3C, 3E, 3F, 3H and 3J for a tachogenerator pulse repetition frequency lower than that of the square wave pulse train. A separate two-state device in the form of a bistable device is associated with each pair of gates and has its two inputs connected to the respective outputs of the associated pair of gates. There are thus three bistable devices 13, 23 and 33, the device 13 being connected by lines B and C to the outputs of gates 11 and 12, the device 23 being connected by lines E and F to the outputs of gates 21 and 22 and the device 33 being connected by lines H and J to the outputs of gates 31 and 32. Each device 13, 23 and 33 is arranged to assume one condition upon the appearance of an output pulse from one of the associated pair of gates and the other condition upon the appearance of an output pulse from the other of the associated pair of gates. Three ON/OFF switches 14, 24 and 34 are respectively associated one with each device 13, 23 and 33 and are arranged to assume the ON condition when the associated bistable device assumes a selected one of its two conditions to connect the respective associated phase winding indicated at 15, 25 and 35 of a three-phase stepping motor 6 to a D.C. power supply along supply lines 7. The motor 6 drives a shaft 8 and controls, through a reduction gear box 9, means for controlling the speed of rotation of the shaft 2. Specifically, the shaft 2 may be driven by the gas generator of a gas turbine engine and the shaft 8 may control the fuel supply to the engine.

In the operation of the arrangement described, a tachogenerator pulse will always cause one or other of the assocaited pair of gates to conduct and produce an output for the duration of the tachogenerator pulse. Effectively, the tachogenerator pulses along line A are switched to either one of lines B and C according to the phase of the square wave pulse train output from the oscillator 3. Similarly, tachogenerator pulses along lines D and G are switched to lines E or F and H or J respectively. The signals along output lines B, E, H, C, F and J are used to trigger the associated bistable devices so that the state of the devices 13, 23 and 33 indicates whether the tachogenerator pulse of the associated phase has occurred when the square wave output from the oscillator 3 is positive or negative. A succession of tachogenerator pulses coinciding with a particular square wave polarity will continually produce trigger pulses on a particular input of the corresponding bistable device. Thus for equal tachogenerator pulse and square wave pulse frequencies all the bistable devices will remain in one unchanging condition. If, however, the frequency of the tachogenerator pulses differs from that of the square wave pulses, the tachogenerator pulses will not always coincide with a particular square wave polarity with the result that the tachogenerator pulses will effectively be switched from one of the associated pair of gates to the other and the associated bistable device will change its condition when the tachogenerator pulses change from coincidence with one square wave polarity to the other. The outputs from the bistable devices 13, 23 and 33 are respectively shown in FIGS. 2L, 2M and 2N for a tachogenerator pulse frequency greater than the square wave pulse frequency and in FIGS. 3L, 3M and 3N for a tachogenerator pulse frequency less than the square wave pulse frequency and the driving wave forms to the phase windings 15, 25 and 35 are indicated by the shaded portions of the wave forms in these figures. It will be seen that the frequency at which the bistable devices 13, 23 and 33 change their condition and hence the frequency of the driving wave forms to the phase windings 15, 25 and 35 is a function of the difference between the repetition frequencies of the tachogenerator pulse trains and the square wave pulse train and that the relative phases of these driving wave forms denotes the sense of this difference so that the stepping motor 6 is driven at a rate proportional to the difference and in a direction representing the sense of the difference. The rotation of the output shaft 8 can therefore be used to control means for reducing this difference, i.e. to bring the speed of rotation of the shaft back towards the datum value.

As the stepper motor flux vector changes direction six times per revolution of the motor rotor (due to the overlap of L, M and N pulses) the motor rotates by 60° angular steps.

The frequency of the stepper motor driving wave form is subject to two limitations. Firstly, this frequency must not be equivalent to a motor speed greater than that possible under load conditions of the system. Secondly, at drive frequencies representing large differences between the repetition frequencies of the tachogenerator pulses and the square wave pulses, phase shifts will occur in the outputs of the individual outputs of the bistable devices which can be of a magnitude equivalent to the time interval between pulses in any one tachogenerator pulse train phase and can be large enough to cause intermittent loss of a drive step so that the motor changes from six to three steps per revolution of the shaft 8.

Figure 4:
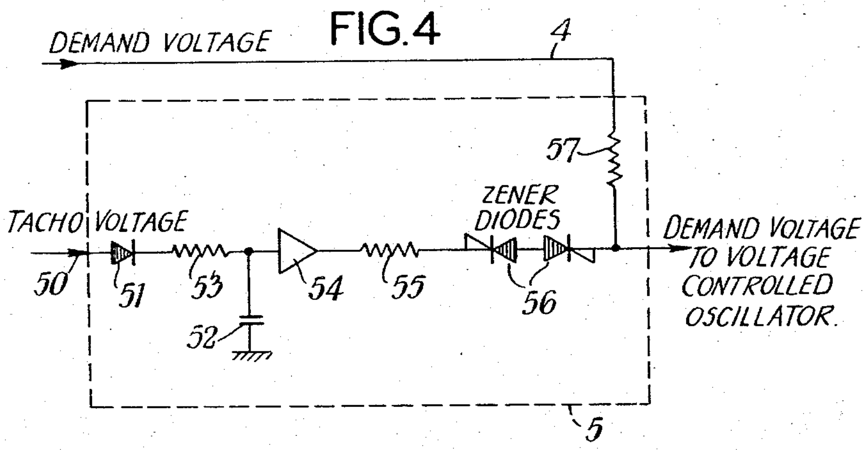

The first limitation referred to above is dominant in most applications and it is therefore necessary to ensure that the repetition frequency of the square wave pulse train cannot depart by more than a predetermined amount from the repetition frequency of the tachogenerator pulses and this is the purpose of the demand voltage limiter 5 which is shown in greater detail in FIG. 4. One of the tachogenerator pulse train phases is supplied to the demand limiter 5 along line 50 and is rectified by rectifier 51 and integrated by a capacitor 52 and resistor 53 and applied to the input of an amplifier 54 with a low output resistance denoted by resistor 55. The output from the amplifier 54 is thus a function of the frequency of the applied tachogenerator pulse train and is applied to one side of two zener diodes 56 connected back to back. The other side of the zener diodes 56 is connected to the oscillator 3 and, through a resistor 57 to the demand voltage line 4. The voltage appearing at this other side of the zener diodes 56 and hence the voltage applied to the oscillator 3 is thus effectively limited to the output voltage of the amplifier 54 plus or minus the zener voltage of the diodes 56. Hence the repetition frequency of the square wave pulse train is limited to that of the tachogenerator phases plus or minus a value determined by the zener voltage of the diodes 56.

It will be appreciated that, in a gas turbine engine control system, the speed of rotation of the shaft 2 can represent the gas generator speed and the demand voltage representing the datum value of this speed can be derived as a function of one or more engine parameters such as, for example, free turbine speed, a selected speed datum, engine temperature and starting over-riding factors.

It will also be appreciated that the datum value of the speed of rotation of the shaft 2 or any similar parameter to be controlled may be derived as a square wave pulse train internally within circuitry associated with the control system and applied to point K in the circuit of FIG. 1 in which case the oscillator 3, limiter 5, and lines 4 and 50 would be omitted.

Figure 5:
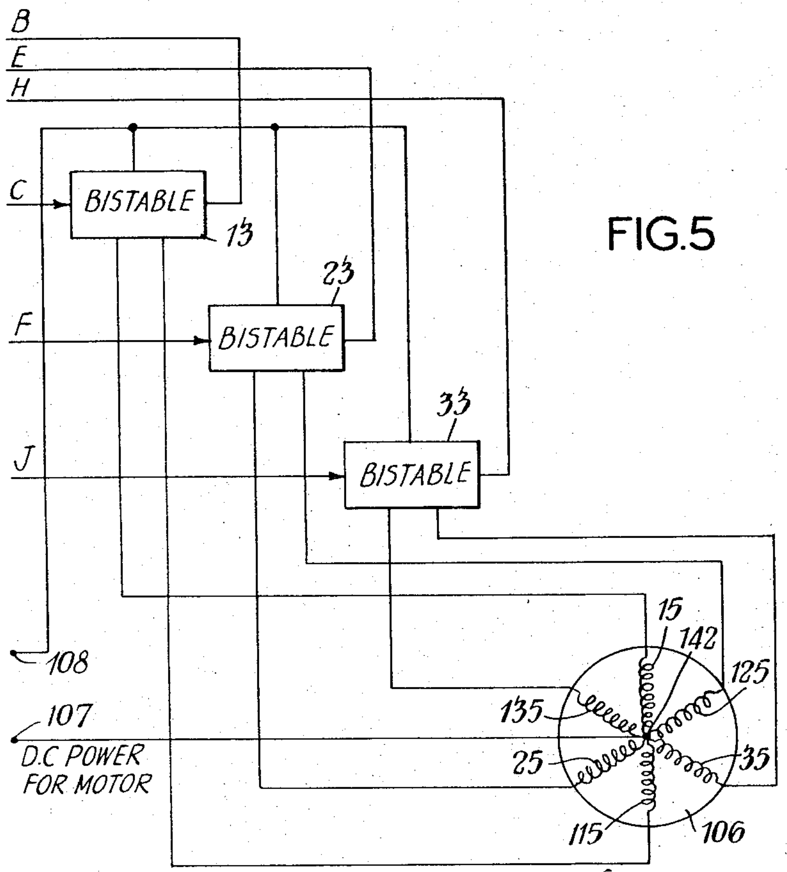
FIG. 5 is a block schematic circuit diagram illustrating a modification.

The arrangement described above with reference to FIGS. 1 to 4 may be modified as shown in FIG. 5 by omitting the switches 14, 24 and 34 and substituting for the three phase motor 6 a six-phase stepping motor 106 having six equiangularly arranged stator windings arranged in relatively opposite pairs 15 and 115, 25 and 125 and 35 and 135 respectively, each pair being respectively associated with the bistable devices 13, 23 and 33. In the arrangement described with reference to FIGS. 1 to 4 only one condition of the bistable devices 13, 23 and 33 is sensed and used to control the motor 6 but, in this modified arrangement, both conditions of the bistable devices are sensed. Thus, the windings 15, 25 and 35 are energised by the one condition of the respective bistable devices 13, 23 and 33 as before, and the windings 115, 125 and 135 are energised by the other condition of the respective bistable devices 13, 23 and 33. The windings 15, 25 and 35 are connected through a common point 142 to one pole 107 of a D.C. power supply and the bistable devices 13, 23 and 33 act as switches to connect one or other of the associated pair of windings to the other pole 108 of the supply.

The sequence of energisation of the motor windings in this case is as follows:

| Forward rotation: | Reverse rotation: |
|---|---|
| **135**, **15** and **125** | **135**, **15** and **125** |
| **15**, **125** and **35** | **25**, **135** and **15** |
| **125**, **35** and **115** | **115**, **25** and **135** |
| **35**, **115** and **25** | **35**, **115** and **25** |
| **115**, **25** and **135** | **125**, **35** and **115** |
| **25**, **135** and **15** | **15**, **125** and **35** |
| **135**, **15** and **125** | **135**, **15** and **125** |

It will be appreciated that the modified arrangement described with reference to FIG. 5, apart from the manner in which the motor is controlled, operates similarly to that described with reference to FIGS. 1 to 4.

Figure 2:
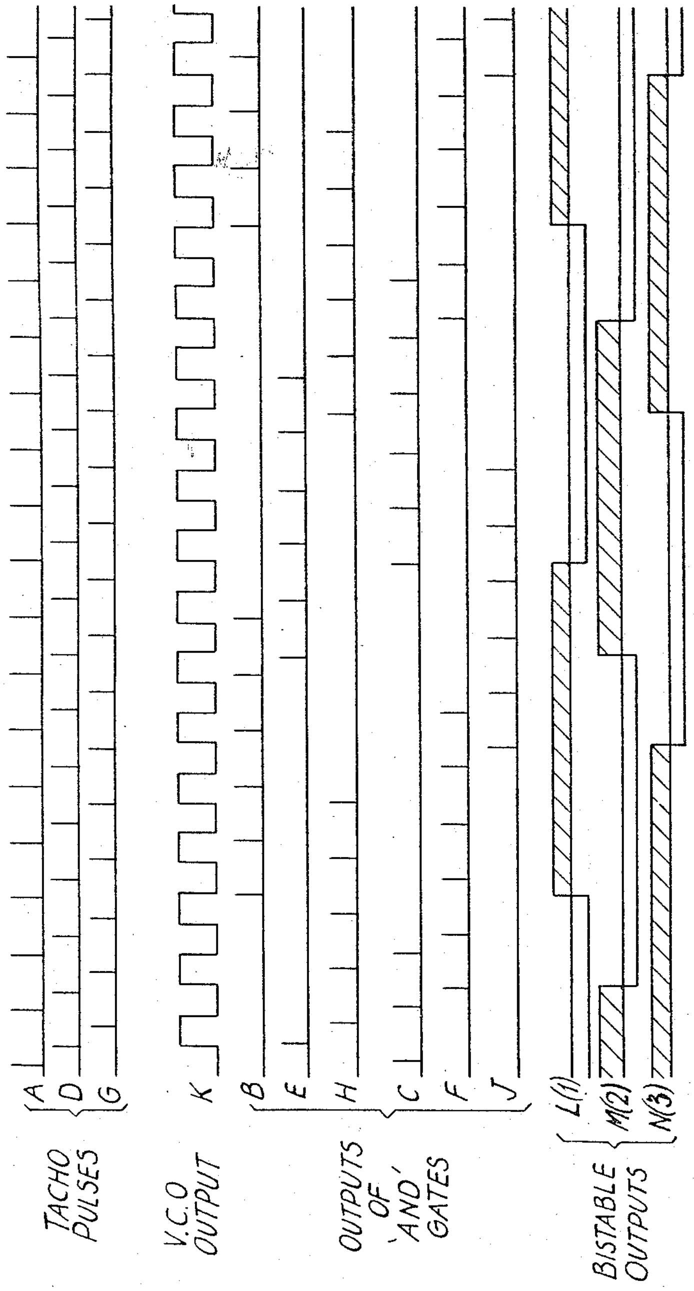
Figure 3:
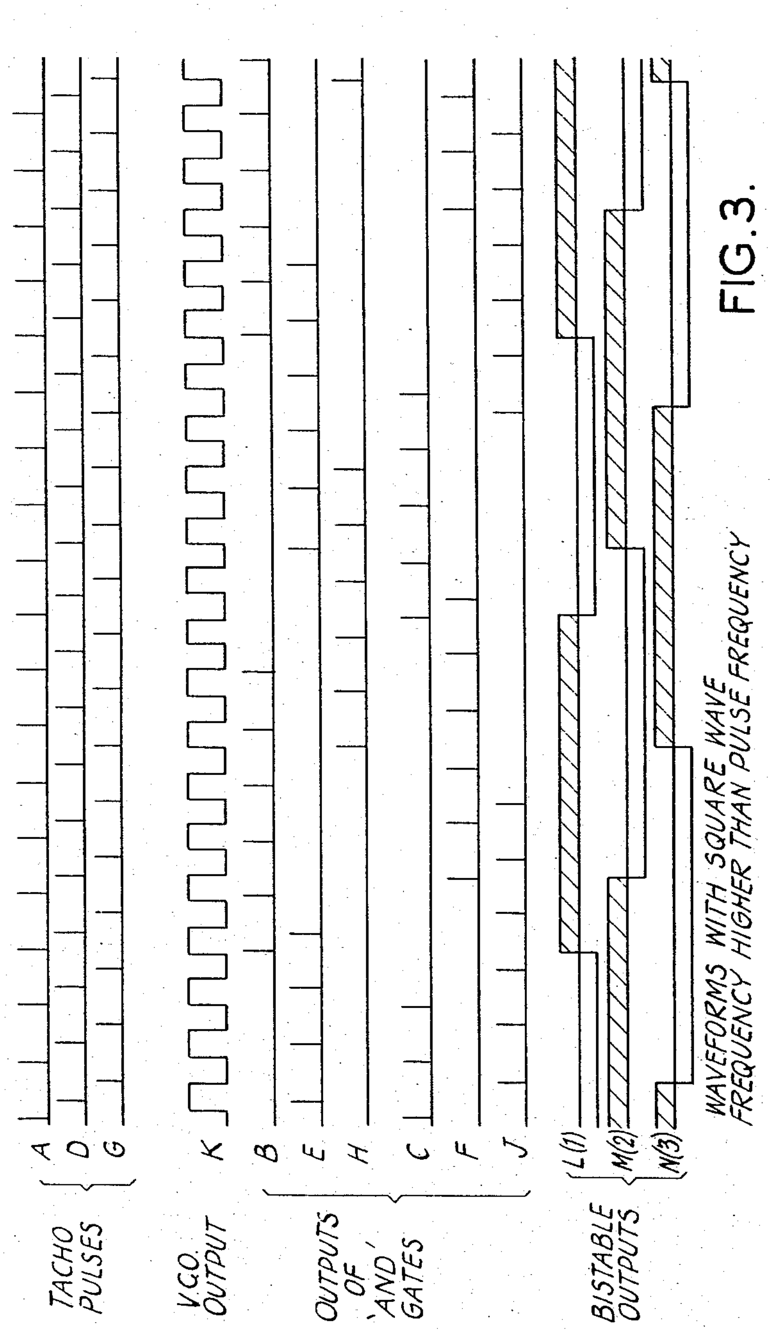
Figure 6:
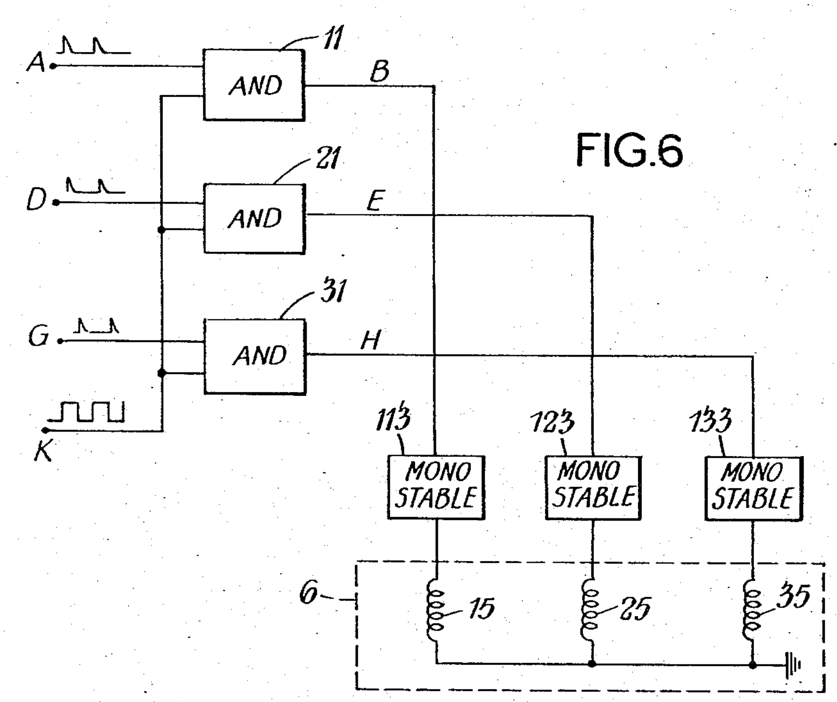
FIG. 6 is a block schematic circuit diagram illustrating a further modification.

In the arrangement described with reference to FIGS. 1 to 4, two sets of AND gates are provided, one set controlling the switching of the bistable devices to one condition and the other set controlling the switching of the bistable devices to the other condition. This arrangement may be modified as shown in FIG. 6 by omitting the one set of gates 12, 22 and 32 and substituting for the bistable devices 13, 23 and 33 different two-state devices in the form of monostable devices 113, 123 and 133 incorporating a delay which operates when the monostable devices are switched to the unstable condition to hold them in that condition for a period of time greater than the interval of time between successive spikes or pulses in each of the three phase displaced pulse trains. Whilst in the unstable condition, each monostable device 113, 123 and 133 allows current to flow through the respectively associated winding 15, 25 and 35 of the stepping motor 6. Thus, as before, the outputs from the gates 11, 21 and 31 will be as shown in FIGS. 2B, 2E and 2H respectively or 3B, 3E and 3H respectively and the respectively associated monostable devices will be switched to the unstable condition for periods of time corresponding to the waveforms 2L, 2M and 2N respectively or 3L, 3M and 3N respectively and the motor windings 15, 25 and 35 will be supplied with corresponding pulses of current to advance the rotor of the motor 6 at a rate proportional to the difference in the two frequencies and in a direction representing the sense of such difference.

It will be appreciated that the three relatively phase displaced pulse trains need not necessarily be derived from a three phase tachogenerator such as shown in FIG. 1 and that other means may be employed. For example, a single phase tachogenerator may be employed, to generate a single train of spikes or pulses at the requisite frequency and this single train may be supplied to a suitable counting circuit which effectively divides the pulse train into three separate phase displaced pulse trains by directing the first, fourth, seventh and so on pulses into one channel, the second, fifth, eighth and so on pulses into a second channel and the third, sixth, ninth and so on pulses into a third channel.

Figure 7:
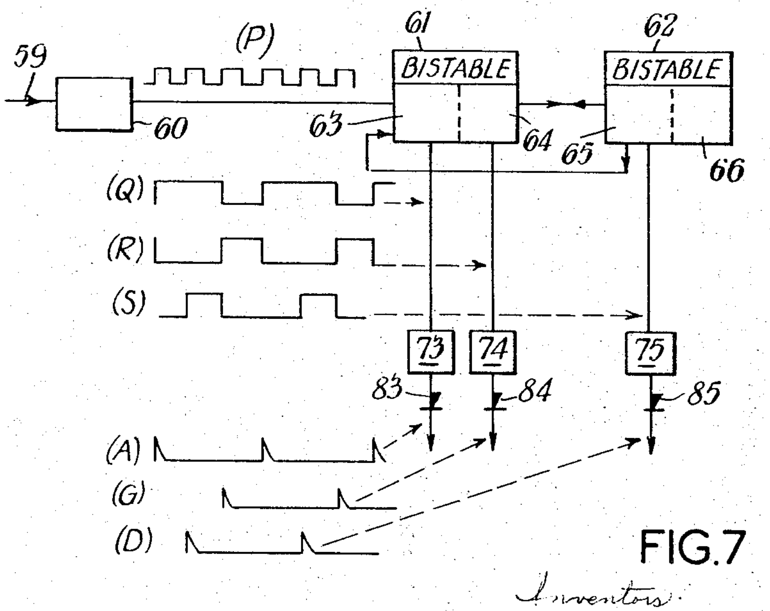
FIG. 7 is a block schematic circuit diagram illustrating a still further modification.

It will also be appreciated that the parameter to be controlled need not necessarily be derived directly as a frequency, as in the arrangement described with reference to FIG. 1 in which the frequency of rotation of the shaft 2 is controlled, but it may be derived as a D.C. voltage. Such a derived D.C. voltage may be used to control the pulse repetition frequency of a square wave generator from the output of which the desired three phase displaced pulse trains may be derived. Such an arrangement is shown in FIG. 7 in which the derived D.C. voltage representing the parameter to be controlled is supplied along input line 59 to a square wave generator 60 the repetition frequency of which is a function of the derived D.C. voltage. The generated square wave is indicated at P and is applied to the input of a divide-by three counter in the form of two bistable devices 61 and 62 each embodying two transistors and associated circuitry one of which transistors is made conducting when the other is non-conducting. The two transistors of the first bistable device 61 are indicated schematically at 63 and 64 and those of the device 62 are indicated at 65 and 66. The transistors 63, 64 and 65 are effectively connected in a ring with a feed-back connection from the transistor 65 to the input of the bistable device 63. Each bistable device 61 and 62 has two stable states which are conveniently denoted as 0 and 1 and the arrangement is such that:

(i) Each pulse of the generated square wave tends to change the state of the bistable device 61, i.e. from 0 to 1 or from 1 to 0;

(ii) Each time the state of the bistable device 61 starts to change 1 to 0, the bistable device 62 is caused to change its state from 0 to 1 or from 1 to 0 and (iii) Each time the bistable device 62 changes its state from 0 to 1 the feed back connection operates to prevent the bistable device 61 changing its state.

Assuming both bistable devices start in the 0 state, then the sequential states of these devices is as follows:

| Number of pulse from generator 60 | State of bistable devices | |
|---|---|---|
| | Device 61 | Device 62 |
| 1 | 0 | 0 |
| | 1 | 0 |
| 2 | (0) | 1 |
| | 1 feedback | 1 |
| 3 | 0 | 0 |
| 4 | 1 | 0 |
| 5 | (0) | 1 |
| | 1 feedback | |
| 6 | 0 | 0 |

The output wave-forms from the transistors 63, 64 and 65 and associated circuitry are indicated at Q, R and S and it will be observed that the waveform S is composed of pulses having a leading or rising edge portion lagging a corresponding leading or rising edge portion of the waveform Q by 120° and the waveform R has a leading or rising edge portion lagging a corresponding rising edge portion of the waveform S by 120°. Each waveform Q, R and S is supplied to a separate associated differentiating circuit 73, 74, and 75 the output of which is rectified by an associated rectifying device 83, 84 and 85 so that the output from each rectifying device is a train of spikes or pulses indicated at A, D and G which are 120° phase displaced with respect to each other and which may be respectively applied to the gates 11, 21 and 31 of the arrangement illustrated in FIG. 1 or FIG. 6. These three trains of spikes or pulses correspond to those shown in FIGS. 2A, 2D and 2G and FIGS. 3A, 3D and 3G.

It will be appreciated that for the purposes of frequency comparison and system control, it is not material which one of the frequencies represents the parameter under control and which one represents the datum or demanded value. In the above described examples, the repetition frequency of the three phase displaced pulse trains has been described as representing the magnitude of the parameter under control and the repetition frequency of the generated square wave applied to the AND gates has been described as representing the datum or demanded value of the parameter. These functions may be reversed. Thus, for example, referring to FIG. 7, the signal applied along line 59 to control the repetition frequency of the square wave generated by the generator 60 may represent the datum or demanded value of the parameter and the repetition frequency of the square wave applied to the gates 11, 21 and 31 and, where applicable, to the gates 12, 22 and 32 may represent the actual value of the parameter and may be derived either by a D.C. signal controlling a generator similar to the generator 60 or from an alternating signal passed through a squaring amplifier which shapes the alternating signal to the form of a square wave.

We claim:

1. In a control system, means for generating at least one first repetitive electric signal of which the frequency represents the magnitude of a first quantity associated with the system, means for generating at least one second repetitive electric signal of which the frequency represents the magnitude of a second quantity associated with the system, frequency comparison means supplied with said first and second repetitive electric signals and arranged in response to generate an error signal which represents the difference between the magnitudes of said first and second quantities, said error signal comprising a set of at least two further repetitive electric signals of which the frequency is a function of the magnitude of, and of which the mutual relative phase-displacement represents the sense of, the difference between the frequencies of said first and second repetitive electric signals, and an electric motor of the synchronous type arranged to be driven by said further repetitive electric signals, whereby the position of the rotor of said electric motor is a function of the integral, with respect to time, of the difference between the magnitudes of said first and second quantities.

2. A control system according to claim 1, wherein the frequency of said first repetitive electric signal represents the actual value of at least one first parameter associated with said system, and the frequency of said second repetitive electric signal represents the demanded value of said first parameter, whereby the position of the rotor of the electric motor is a function of the integral, with respect to time, of the error between the actual and the desired values of the said first parameter or parameters.

3. A control system according to claim 1, wherein said means for generating said first repetitive electric signals includes means for generating a third repetitive electric signal of which the frequency represents the magnitude of said first quantity, and a frequency-dividing circuit supplied with said third repetitive electric signal and arranged in response to generate said first repetitive electric signals in the form of a set of at least two repetitive electric signals which are mutually relatively phase-displaced and which have a frequency which is a sub-multiple of the frequency of said third repetitive electric signal.

4. A control system according to claim 1, wherein there are $n$ of said first repetitive electric signals and these signals are mutually relatively phase-displaced by substantialy $(360/n)$ degrees.

5. A control system according to claim 1, which includes control means responsive to changes in the position of said rotor of said electric motor to tend to modify at least one of said first and said second quantities in the sense to tend to reduce the difference between the frequencies of said first and second repetitive electric signals.

6. A control system according to claim 1, which includes means for generating a first D.C. signal representing the magnitude of said first quantity, and wherein said means for generating said first repetitive electric signal includes a voltage-controlled oscillator responsive to said first D.C. signal to generate said first repetitive electric signal.

7. A control system according to claim 1, which includes means for generating a second D.C. signal representing the magnitude of said second quantity, and wherein said means for generating said second repetitive electric signal includes a voltage-controlled oscillator responsive to said second D.C. signal to generate said second repetitive electric signal.

8. A frequency-comparison device for generating an error signal in the form of a plurality of similar but cyclically phase-displaced output pulse-trains of a frequency which is a function of the frequency difference of first and second frequencies to be compared, the sense of the mutual relative phase-displacement of said output pulse-train representing the sense of said frequency difference, the device including generator means arranged to generate a plurality of similar but cyclically phase-displaced input pulse-trains of a frequency which is a function of said first frequency, further generator means arranged to generate a first square-wave pulse-train having a frequency which is a function of said second frequency and also arranged to generate a second square-wave pulse-train similar to said first square-wave pulse-train but in anti-phase thereto, a separate first and a separate second two-input AND-gate corresponding to each said input pulse train, means for supplying each said input pulse-train to one of said two inputs of each of the said corresponding first and second gates, means for supplying said first square-wave pulse-train to the other input of each of said first gates, means for supplying said second square-wave pulse-train to the other input of each of said second gates, whereby each said gate delivers an output signal only upon the simultaneous occurrence of a pulse of said corresponding pulse-train and a pulse, of one predetermined polarity, of a selected one of said first and second square-wave pulse-trains, a separate bistable device corresponding to and connected to each set of said first and second gates to respond to said output signals to transfer said bistable device from one of its two states to the other, and vice versa, respectively upon the receipt of said input signal from said corresponding first gate and said output signal from said corresponding second gate, each said bistable device being arranged, when in at least a selected one of its said two states, to deliver a steady electric output signal corresponding to that state, said electric output signals of said bistable devices forming said output signal from said corresponding first gate and number of phase windings equal in number to the number of said output-pulse-trains and electrically connected to said bistable devices whereby each said output pulse-train controls the electrical energisation of a corresponding one of said phase windings and whereby said motor is advanced at a rate which is a function of the magnitude of said frequency difference and in a direction corresponding to the sense of said frequency difference.

9. A frequency-comparison device for generating an error signal in the form of a plurality of similar but cyclically phase-displaced output pulse-trains of a frequency which is a function of the frequency difference of first and second frequencies to be compared, the sense of the mutual relative phase-displacement of said output pulse-trains representing the sense of said frequency difference, the device including generator means arranged to generate a plurality of similar but cyclically phase-displaced input pulse-trains of a frequency which is a function of said first frequency, further generator means arranged to generate a first square-wave pulse-train having a frequency which is a function of said second frequency and also arranged to generate a second square-wave pulse-train similar to said first square-wave pulse-train but in anti-phase thereto, a separate first and a separate second two-input AND-gate corresponding to each said input pulse-train, means for supplying each said input pulse-train to one of said two inputs of each of the said corresponding first and second gates, means for supplying said first square-wave pulse-train to the other input of each of said first gates, means for supplying said second square-wave pulse-train to the other input of each of said second gates, whereby each said gate delivers an output signal only upon the simultaneous occurrence of a pulse of said corresponding pulse-train and a pulse, of one predetermined polarity, of a selected one of said first and second square-wave pulse-trains, a separate bistable device corresponding to and connected to each set of said first and second gates to respond to said output signals to transfer said bistable device from one of its two states to the other, and vice versa, respectively upon the receipt of said output signal from said corresponding first gate and said output signal from said corresponding second gate, each said bistable device having a single output and being arranged, when in said selected one of its said two states, to deliver at its said output said steady electric output signal of one polarity and, when in the other of its said two states, to deliver at its said output a further steady electric output signal of the relatively opposite polarity, whereby a separate one of said output pulse-trains appears at each said output of said bistable devices, and a stepping motor having a number of phase windings equal in number to the number of said bistable devices, a power supply, and a separate switch means associated with each said bistable device and electrically connected to said output of said associated bistable device and to a separate corresponding one of said phase windings and to said power supply to control the connection of said power supply to said phase windings in response to said output pulse-trains, whereby said motor is advanced at a rate which is a function of the magnitude of said frequency difference and in a direction corresponding to the sense of said frequency difference.

10. A frequency-comparison device for generating an error signal in the form of a plurality of similar but cyclically phase-displaced output pulse-trains of a frequency which is a function of the frequency difference of first and second frequencies to be compared, the sense of the mutual relative phase-displacement of said output pulse-trains representing the sense of said frequency difference, the device including generator means arranged to generate a plurality of similar but cyclically phase-displaced input pulse-trains of a frequency which is a function of said first frequency, further generator means arranged to generate a first square-wave pulse-train having a frequency which is a function of said second frequency and also arranged to generate a second square-wave pulse-train similar to said first square-wave pulse-train but in anti-phase thereto, a separate first and a separate second two-input AND-gate corresponding to each said input pulse-train, means for supplying each said input pulse-train to one of said two inputs of each of the said corresponding first and second gates, means for supplying said first square-wave pulse-train to the other input of each of said first gates, means for supplying said second square-wave pulse-train to the other input of each of said second gates, whereby each said gate delivers an output signal only upon the simultaneous occurrence of a pulse of said corresponding pulse-train and a pulse, of one predetermined polarity, of a selected one of said first and second square-wave pulse-trains, a separate bistable device corresponding to and connected to each set of said first and second gates to respond to said output signals to transfer said bistable device from one of its two states to the other, and vice versa, respectively upon the receipt of said output signal from said corresponding first gate and said output signal from said corresponding second gate, each said bistable device having two outputs and being arranged, when in said selected one of its said two states, to deliver at one of its said outputs said steady electrical signal of one polarity and, when in the other of its said two states, to deliver at the other of its said outputs a further steady electrical output signal of said one polarity, whereby each said bistable device supplies a corresponding two of said output pulse-trains respectively at said one and said other of its said outputs, and a stepping motor having a number of pairs of oppositely connected phase windings equal in number to the number of said bistable devices and associated one pair with each said bistable device, said two outputs of each said bistable device being respectively electrically connected to the associated said pair of phase windings, whereby said motor is advanced at a rate which is a function of the magnitude of said frequency difference and in a direction corresponding to the sense of said frequency difference.

11. A frequency-comparison device for generating an error signal in the form of a plurality of similar but cyclically phase-displaced output pulse-trains of a frequency which is a function of the frequency difference of first and second frequencies to be compared, the sense of the mutual relative phase-displacement of said output pulse-trains representing the sense of said frequency difference, the device including generator means arranged to generate a plurality of similar but cyclically phase-displaced input pulse-trains of a frequency which is a function of the said first frequency, further generator means arranged to generate a square-wave pulse-train having a frequency which is a function of said second frequency, a separate two-input AND gate corresponding to each said input pulse-train and having the said corresponding input pulse-train supplied to one input thereof and having said square-wave pulse-train supplied to the other input thereof, whereby each said gate delivers an output signal only upon the simultaneous occurrence of a pulse of said corresponding input pulse-train and a pulse, of one predetermined polarity, of said square-wave pulse-train, a separate monostable device corresponding to and connected to each said gate and having an unstable state and a stable state, each said monostable device being arranged to respond to said output signal from said corresponding gate to transfer said monostable device to its said unstable state for a period of time not less than the interval of time between successive pulses of any one of said input pulse trains whereafter said monostable device returns to its said stable state unless a further said output signal is received from said corresponding gate, each said monostable device being arranged, when in at least a selected one of its said two states, to deliver a steady electric output signal corresponding to that state, said electric output signals of said monostable devices forming said output pulse-trains, and a stepping motor having a number of phase windings equal in number to the number of said monostable devices, each said phase winding being associated with and electrically connected to a separate corresponding one of said monostable devices whereby each said output pulse-train controls the electrical energisation of a corresponding one of said phase windings and whereby said motor is advanced at a rate which is a function of said frequency difference and in a direction corresponding to the sense of said frequency difference.

References Cited

UNITED STATES PATENTS

| | | | |
|---|---|---|---|
| 3,241,023 | 3/1966 | Eby | 318—141 X |
| 3,218,538 | 11/1965 | Sear | 318—341 X |
| 3,206,683 | 9/1965 | Davis et al. | 318—28 |
| 3,127,548 | 3/1964 | Van Enden | 310—49 X |
| 3,112,433 | 11/1963 | Fairbanks | 318—138 |
| 2,860,294 | 11/1958 | Steele | 318—28 |
| 2,768,331 | 10/1956 | Getrone | 290—40 X |
| 2,562,943 | 8/1951 | Pensyl | 318—28 |
| 2,429,771 | 10/1947 | Roberts | 318—28 |
| 2,452,575 | 11/1948 | Kenny | 318—28 |
| 2,468,350 | 4/1949 | Sunstein | 318—28 |
| 2,562,743 | 8/1951 | Pensyl | 318—28 |
| 2,632,871 | 3/1953 | Erickson et al. | 318—28 |
| 2,887,621 | 5/1959 | Wilde | 290—40 |
| 2,978,620 | 5/1961 | Schlatter | 318—28 |

ORIS L. RADER, *Primary Examiner.*

G. SIMMONS, *Assistant Examiner.*